United States Patent
Katsube et al.

[11] 3,864,330
[45] Feb. 4, 1975

[54] BENZODIAZEPINE DERIVATIVES AND PRODUCTION THEREOF

[75] Inventors: Junki Katsube, Toyonaka; Yoshinori Takashima, Minoo; Toshiyuki Hirohashi, Ashiya; Kikuo Ishizumi, Ikeda; Mitsuhiro Akatsu, Toyonaka; Kazuo Mori, Kobe; Isao Katsuki, Minoo; Yoshiharu Kume, Takarzuka; Hiromi Sato, Takarzuka; Shigeho Inaba, Takarzuka; Hisao Yamamoto, Nishinomiya, all of Japan

[73] Assignee: Sumitomo Chemical Company, Limited

[22] Filed: Aug. 21, 1972

[21] Appl. No.: 282,012

[30] Foreign Application Priority Data
Aug. 31, 1971 Japan.............................. 46-67310
Nov. 5, 1971 Japan.............................. 46-88569
Nov. 8, 1971 Japan.............................. 46-89237
Jan. 31, 1972 Japan.............................. 47-11729
Apr. 26, 1972 Japan.............................. 47-43036

[52] U.S. Cl. .................... 260/239.3 D, 424/244
[51] Int. Cl. ............................................. C07d 33/06
[58] Field of Search ......................... 260/239.3 D Primary Examiner—Henry R. Jiles
Assistant Examiner—Robert T. Bond
Attorney, Agent, or Firm—Wenderoth, Link & Ponack

[57] ABSTRACT

The present invention relates to 1,4-benzodiazepine derivatives represented by the general formula:

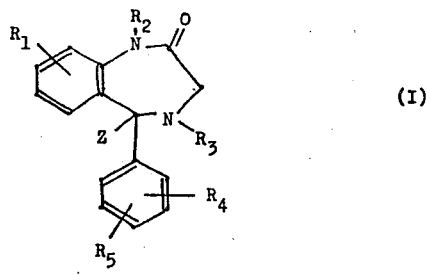

(I)

wherein $R_1$ is a member selected from the group consisting of hydrogen, halogen, nitro, and trifluoromethyl group, $R_2$ represents a member selected from the group consisting of hydrogen, $C_1 - C_6$ alkyl, $C_2 - C_6$ alkenyl or alkynyl, $C_3 - C_6$ cycloalkyl- $C_1 - C_4$ alkyl, and substituted or unsubstituted hydroxy- $C_1 - C_4$ alkyl group, $R_3$ represents alkyl group having 1 — 4 carbon atoms, each of $R_4$ and $R_5$ represents a member selected from the group consisting of hydrogen, halogen, $C_1 - C_4$ alkyl, and trifluoromethyl group, and Z represents

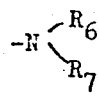

(wherein each of $R_6$ and $R_7$ represents hydrogen, $C_1 - C_6$ alkyl, $C_2 - C_6$ alkenyl or alkynyl, $C_3 - C_6$ cycloalkyl- $C_1 - C_4$ alkyl, substituted or unsubstituted hydroxy, substituted or unsubstituted hydroxy- $C_1 - C_4$ alkyl, or substituted or unsubstituted amino, or substituted or unsubstituted amino- $C_1 - C_4$ alkyl group), —CN, —$R_8$ (wherein $R_8$ represents $C_1 - C_{10}$ alkyl, or $C_1 - C_4$ alkoxy- $C_1 - C_4$ alkyl group),
—$OCH_2$—$R_9$ (wherein $R_9$ represents hydrogen, $C_1 - C_6$ alkyl, $C_2 - C_6$ alkenyl or alkynyl, phenyl, or phenyl- $C_1 - C_4$ alkyl group), or —C≡C-$R_{10}$ (wherein $R_{10}$ represents hydrogen, or $C_1 - C_6$ alkyl groups which may be substituted by a secondary amino group or by a substituted or unsubstituted hydroxy group).

9 Claims, No Drawings

BENZODIAZEPINE DERIVATIVES AND PRODUCTION THEREOF

This invention relates to novel 1,4-benzodiazepine derivatives and also to the production thereof. More particularly, this invention relates to novel 1,4-benzodiazepine derivatives represented by the general formula:

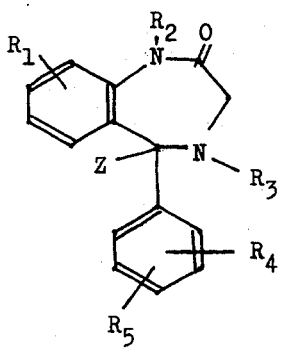

(I)

wherein
$R_1$ is a member selected from the group consisting of hydrogen, halogen, nitro and trifluoromethyl group,
$R_2$ represents a member selected from the group consisting of hydrogen, $C_1 - C_6$ alkyl, $C_2 - C_6$ alkenyl or alkynyl, $C_3 - C_6$ cycloalkyl- $C_1 - C_4$ alkyl, and substituted or unsubstituted hydroxy- $C_1 - C_4$ alkyl group,
$R_3$ represents alkyl group having 1 – 4 carbon atoms, each of $R_4$ and $R_5$ represents a member selected from the group consisting of hydrogen, halogen, $C_1 - C_4$ alkyl, and trifluoromethyl group,
and
Z represents

(wherein each of $R_6$ and $R_7$ represents hydrogen, $c_1 - C_6$ alkyl, $C_2 - C_6$ alkenyl or alkynyl, $C_3 - C_6$ cycloalkyl- $C_1 - C_4$ alkyl, substituted or unsubstituted hydroxy, substituted or unsubstituted hydroxy- $C_1 - C_4$ alkyl, or substituted or unsubstituted amino, substituted or unsubstituted amino- $C_1 - C_4$ alkyl groups),
—CN,
—$R_8$ (wherein $R_8$ represents $C_1 - C_{10}$ alkyl, or $C_1 - C_4$ alkoxy- $C_1 - C_4$ alkyl group),
—$OCH_2—R_9$ (wherein $R_9$ represents hydrogen, $C_1 - C_6$ alkyl, $C_2 - C_6$ alkenyl or alkynyl, phenyl, or phenyl- $C_1 - C_4$ alkyl group),
or —C ≡ C—$R_{10}$ (wherein $R_{10}$ represents hydrogen, or $C_1 - C_6$ alkyl groups which may be substituted by a secondary amino group or by a substituted or unsubstituted hydroxy group).

The examples of substituents on hydroxy or amino group are alkyl, acyl, alkoxycarbonyl, sulfonyl, etc.

According to this invention the novel 1,4-benzodiazepine derivatives of the general formula (I) may be prepared by reacting 1,4-benzodiazepinium derivatives represented by the following general formula:

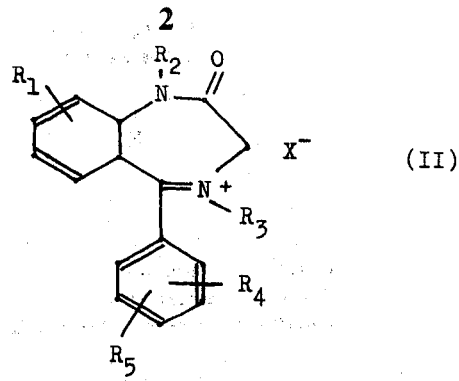

(II)

(wherein $R_1$, $R_2$, $R_3$, $R_4$ and $R_5$ are as defined before and $X^-$ represents an acid residue) with any of the following reactants:

a. an amine derivative of the formula:

(III)

(wherein $R_6$ and $R_7$ are defined before),
b. a cyanation agent,
c. an alkyl metal compound of the formula:

$$R_8 - Y$$

(IV)

(wherein $R_8$ is as defined before and y represents magnesium halide, alkali metal or alkaline earth metal),
d. an alcoholic compound of the formula:

$$R_9 - Ch_2 - OH$$

(V)

(wherein $R_9$ is as defined before),
and
(e) a metal compound of an acetylenic derivative of the formula:

$$HC \equiv C - R_{10}$$

(VI)

(wherein $R_{10}$ is as defined before).

The 1,4benzodiazepinium derivatives (II), the starting material to be used in the present invention may be produced by known methods. Thus, for example, they may be produced by reacting 1,4-benzodiazepine derivatives represented by the general formula:

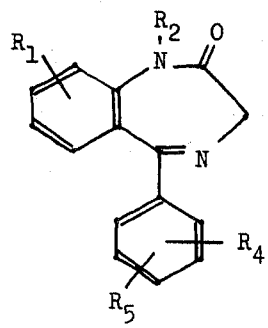

(VII)

(wherein $R_1$, $R_2$, $R_4$ and $R_5$ are as defined before) with general alkylating agents, for example as represented by the general formula:

(VIII)

(wherein $R_3$ and X are as defined before). Moreover, according to our study, the 1,4-benzodiazepinium derivatives (II) are also obtainable by using trialkyloxonium fluoroborate represented by the general formula:

(IX)

(wherein $R_3$ is as defined before).

The 1,4-benzodiazepinium derivatives represented by the general formula (II) correspond to the 4-alkyl substituted compounds (quaternary salts) of 1,4-benzodiazepine-5-phenyl-2-one derivatives (VII). However, their chemical reactivities are little known up to the present.

We have been making intensive studies on the chemical reactivities of the 1,4 -benzodiazepinium derivatives (II) and have now found that these derivatives react with a very wide variety of the compounds (a), (b), (c), (d) and (e) mentioned before, to give novel 1,4-benzodiazepine derivatives having new structure as represented by the general formula (I). That is, it was found by use that the electrophilicity at the 5-position of the 1,4-benzodiazepinium derivatives (II) is very high and therefore several nucleophiles such as (a), (b), (c), (d) and (e) easily attack at the 5-position of the 1,4-benzodiazepinium derivaties (II), giving 5-substituted 1,4-benzodiazepine derivatives (I).

As for the reactant (a), a very wide variety of amine derivatives represented by the general formula (III) can be used.

Thus, for example, ammonia and saturated or unsaturated straight-chain, branched or cyclic amine derivatives such as methylamine, ethylamine, propylamine, isopropylamine, butylamine, isobutylamine, sec-butylamine, amylamine, dimethylamine, allylamine, benzylamine, phenethylamine, crotylamine, cyclopropylmethylamine, cyclopropylamine, cyclohexylamine, etc., may be used. Further, hydroxylamine, hydroxyethylamine, hydroxypropylamine, or these amines substituted at their O-position with an alkyl group such as methyl, ethyl, etc., or with an acyl group such as acetyl, benzoyl, etc. may also be used. In addition, hydrozine, ethylenediamine, propylenediamine, or these amines substituted at their one-side N-position with an alkyl group such as methyl, ethyl, etc., or with an acyl group such as acetyl, benzoyl, phthaloyl, etc., may be also used.

The reactant (b), i.e., cyanation agents to be used in the method of the present invention may be one of those that can produce cyanide ion as nucleophilic agent at the time of reaction. For example, cyanic acid, and its metallic salts such as sodium cyanide, potassium cyanide, etc., are representative examples. Also, compounds which may be called "latent cyanic acid" such as acetone cyanohydrin, complex compounds of trialkylalumium and cyanic acid, etc., may also be used.

The reactant (c) is an alkyl metal compounds of the formula (IV). Such alkyl metal compounds to be used in the reaction of the present invention are metal compounds of the alkyl groups such as methyl, ethyl, propyl, butyl, isobutyl, amyl, isoamyl, heptyl, octyl, etc., or the alkoxyalkyl group such as methoxyethyl, ethoxyethyl, methoxypropyl, etc.

Examples of the metallic portion of the alkyl metal compounds are magnesium halide, lithium, cadomium, zinc, etc.

Representatives of such alkyl metal compounds are methylmagnesium bromide, methylmagnesium iodide, ethylmagnesium bromide, butylmagnesium bromide, methoxypropylmagnesium bromide, methyllithium butyllithium, methylcadmium, ethylzinc, etc.

The reactant (d) is an alcoholic compounds of the formula (V). For the alcoholic compounds, various alkanols such as methyl alcohol, ethyl alcohol, propyl alcohol, butyl alcohol, allyl alcohol, crotyl alcohol, propargyl alcohol, benzyl alcohol, etc., may be used.

The reactant (e) is a metal compounds of an acetylenic derivative of the formula (VI). Examples of the metallic portion of the acetylenic metal compounds are magnesium halide, lithium, sodium, potassium, etc.

Such metal compounds include metal compounds of alkines such as acetylene, 1-propyne, 1-butyne, etc., which may have a substituent such as hydroxy group or secondary amino group on their carbon chain except acetylene. The hydroxy group may also have a substituent of alkyl, aryl, aralkyl group, etc. The secondary amino group may be acyclic secondary amino group such as dimethylamino, diethylamino, etc., cyclic secondary amino group such as pyrrolidino, piperidino, piperazine, morpholino group, etc., or bicyclic secondary amino group such as 3-azabicyclo(3,2,2)monyl group, etc.

The 1,4-benzodiazepinium derivataive (II) may be reacted with the reactant (a), (b), (c), (d) or (e) directly or in the presence of an inert solvent.

The "inert solvent" means a solvent which does not take part in the reaction. Examples of such solvents are aliphatic and aromatic hydrocarbons such as pentane, hexane, heptane, benzene, toluene, etc.; ethers such as ethyl ether, isopropyl ether, tetrahydrofuran, dioxane, ethyleneglycol dimethyl ether, methylcellusolve, etc.; and other general solvents such as methylene chloride, chloroform, dimethylsulfoxide, dimethylformamide, etc., and alcohols such as methyl alcohol, ethyl alcohol, isopropyl alcohol, butyl alcohol, etc., may be used in the reaction with the reactant (a), (b) or (d). In case of the reaction with the alcoholic compound (d) it may be used excessively to serve also as the solvent.

The relative amounts of the 1,4-benzodiazepinum derivative (II) and the reactant (a), (b), (c), (d) or (e) are not critical, but are preferable to be in substantially stoichiometric (equimolar) proportions, Even if one reactant is somewhat excessive in respect of the other, there is caused no difficulty in the reaction. In case of the reaction with the reactant (a) it is preferable to use the amine derivative (a) in an excessive amount so as to neutralize the acid derived from the acid residue $X^-$ in the material (II) during the reaction.

In the case of the reaction with the alcoholic compound (d), the reaction is completed by the nucleophilic addition of the alcoholic compound to the 5-position of an electrophilic benzodiazepinium compound [II]. To complete this reaction, it is desirable to use a base adequate to neutralize the acid liberated from the quaternary salt [II] during the reaction. For this purpose a variety of bases can be used. However, the use of a weak base is advantageous to suppress side reactions and to increase the selectivity for the progress of the desired reaction. For example, magnesium alkoxides which are the magnesium salts of the alcoholic compounds (d) are preferable.

The reaction temperature is not critical and may vary from a temperature below the room temperature to the room temperature. If desired, it is possible to heat the reaction mixture to promote the reaction.

In some cases the reaction product (I) is crystallized out from the reaction system. The crystals may be separated by filtration. If there is no such crystallization in the resulting reaction mixture, the product (I) may be isolated and recovered in any suitable manner such as concentration, washing with water, solvent extraction, etc., which are well known in the art of separation of a particular organic compound from a reaction mixture. The isolated product (I) may be purified in any usual manner such as recrystallization, chromatography, etc.

The novel 1,4-benzodiazepine derivatives (I) of the present invention are substances that show interesting pharmacological properties on central nervous system such as anticonvulsant, sedative, muscle relaxant, hypnotic and analgesic activities.

Furthermore they can also be used as intermediates for producing other 1,4-benzodiazepine derivatives.

The compounds of the present invention are preferably administrated orally. They may be combined with either a solid or liquid carrier or diluent, and are more available in varying amounts in such pharmaceutical forms as tablets, capsules, powders and aqueous and non-aqueous suspensions and solutions.

The invention will be further explained by means of the following examples which are given for the illustration purpose only and not for limiting the scope of this invention.

EXAMPLE 1

824 mg. of 1,4-dimethyl-2-oxo-5-phenyl-7-chloro-1,3-dihydro-2H-1,4-benzodiazepinium methylsulfate was added to 10 ml. of methanol containing 1 g. of ammonia under cooled condition. The mixture once became a transparent liquid, but after several minutes crystals separated out. After the mixture was stirred for 3 hours at room temperature, the resulting product was collected by filtration to obtain 601 mg. (crystals, yield: 96 percent) of the desired 1,4-dimethyl-5-phenyl-5-amino-7-chloro-1,3,4,5-tetrahydro-2H-1,4-benzodiazepine-2-one. This compound had the following properties. Melting point: 185° – 185.8°C.
Infrared absorption spectrum (paste method): 3,420; 3,150; 3,050; 3,000; 1,700; 1,605; 1,580; 1,520; 1,400; 1,320; cm$^{-1}$
Mass spectrum: 315 (M$^+$, weak), (297, 299), (282, 284), 268, 255, 241.

EXAMPLE 2

230 mg. of 1-methyl-2-oxo-4-ethyl-5-phenyl-7-chloro-1,3-dihydro-2H-1,4-benzodiazepinium fluoroborate was added to 10 ml. of ethanol containing 1 g. of ammonia under cooled condition. The mixture became once a transparent liquid, but after about 10 minutes colorless crystals separated out. The crystals were collected by filtration to obtain 140 mg. (colorless prisms) of the desired 1-methyl-4-ethyl-5-phenyl-5-amino-7-chloro-1,3,4,5-tetrahydro-2H-1,4-benzodiazepine-2-one. This compound had the following properties.
Melting point: 176°– 176.3°C. (decomposed)
Elemental analysis:

|  | C(%) | H(%) | N(%) | Cl(%) |
|---|---|---|---|---|
| Calculated (for C$_{18}$H$_{20}$N$_3$OCl) | 65.54 | 6.10 | 12.73 | 10.74 |
| Found | 65.80 | 6.12 | 12.91 | 10.51 |

Infrared absorption spectrum (paste method): 3,430; 3,160; 3,050; 1,720–1,710; 1,600; 1,570; 1,505; 1,300 cm$^{-1}$
Mass spectrum: [329(M$_-$), 331 (weak)], [311, 313], [296, 298], 282, 255.

EXAMPLE 3

21.11 g. of 1,4-dimethyl-2-oxo-5-phenyl-7-nitro-1,3-dihydro-2H-1,4-benzodiazepinium methylsulfate was reacted with methanolic ammonia and the resulting product was worked up as in Example 1 to obtain 1.30 g. (yield: 80 percent, light yellow fine crystals) of the desired 1,4-dimethyl-5-phenyl-5-amino-7-nitro-1,3,4,5-tetrahydro-2H-1,4-benzodiazepine-2-one. This compound had the following properties: Melting point: 214°– 216°C.
Infrared absorption spectrum (paste method): 3,400; 3,100; 3,050; 1,705; 1,605; 1,585; 1,535; 1,495; 1,305; 1,290; 745; 705 cm$^{-1}$

EXAMPLE 4

1,4-dimethyl-2-oxo-5-(ortho-fluorophenyl)-7-chloro-1,3-dihydro-2H-1,4-benzodiazepinium methylsulfate was reacted with methanolic ammonia and the resulting product was worked up as in Example 1 to obtain colorless fine crystals of the desired 1,4-dimethyl-5-(ortho-fluorophenyl)-5-amino-7-chloro-1,3,4,5-tetrahydro-2-H-1,4-benzodiazepine-2-one. This compound had the following properties.
Melting point: 186°– 188°C.
Infrared absorption spectrum (paste method): 3,430; 3,200; 3,050; 2,800; 1,695; 1,600; 1,580; 1,510; 1,480; 1,105; 805; 765 cm$^{-1}$

EXAMPLE 5

When 1.0 g of 1,4-dimethyl-2-oxo-5-phenyl-7-chloro-1,3-dihydro-2H-1,4-benzodiazepinium methylsulfate was added to 10 ml. of ethanol containing 1 g. of methylamine, white fine needles separated out at once. After the mixture was reacted for 3 hours, the crystals were collected by filtration to obtain 680 mg. (yield: 85 percent, fine needles) of the desired 1,4-dimethyl-5-phenyl-5-methylamino-7-chloro-1,3,4,5-tetrahydro-2H-1,4-benzodiazepine-2-one. This compound had the following properties.
Melting point: 196.5°– 198.3°C.
Infrared absorption spectrum (paste method): 3,345; 3,050; 2,780; 1,710; 1,600; 1,570; 1,510; 1,395; 1,320; 915 cm$^{-1}$
Mass spectrum: [329(M$^+$), 331], [285, 287], [271, 273], 259.

EXAMPLE 6

0.84 g. of 1,4-dimethyl-2-oxo-5-phenyl-7-nitro-1,3- dihydro-2H-1,4-benzodiazepinium methylsulfate was reacted with ethanolic methylamine and the resulting product was worked up as in Example 5 to obtain 0.57 g. (yellow fine needles) of the desired 1,4-dimethyl-5-phenyl-5-methylamino-7-nitro-1,3,4,5-tetrahydro-2H-1,4-benzodiazepine-2-one. This compound had the following properties.
Melting point: 238°– 240°C.
Infrared absorption spectrum (paste method): 3,150; 3,075; 2,800; 1,720; 1,600; 1,580; 1,535; 1,485; 1,380; 1,320; 1,295; 760; 705 cm$^{-1}$

EXAMPLE 7

1.07 g of 1,4-dimethyl-2-oxo-5-(ortho-fluorophenyl)-7-chloro-1,3-dihydro-2-H-1,4-benzodiazepinium methylsulfate was reacted with ethanolic methylamine and the resulting product was worked up as in Example 5 to obtain 0.73 g. (yield: 82 percent, white fine needles) of the desired 1,4-dimethyl-5-(ortho-fluorophenyl)-5-methylamino-7-chloro-1,3,4,5-tetrahydro-2H-1,4-benzodiazepine-2-one. This compound had the following properties.
Melting point: 202°–203°C.
Infrared absorption spectrum (paste method): 3,275; 3,100; 3,050; 2,800; 1,720; 1,605; 1,575; 1,510; 1,485; 1,395; 1,105; 810; 770 cm$^{-1}$

EXAMPLE 8

1.0 g. of 1,4-dimethyl-2-oxo-5-phenyl-7-chloro-1,3-dihydro-2H-1,4-benzodiazepinium methylsulfate was added to 5 ml. of ethanol containing 550 mg. of butylamine. After the reaction was continued for 3 hours, the resulting reaction product was diluted with 70 ml. ether. The thusobtained ether phase was washed with water and dried, and the solvent was then distilled off to obtain 0.86 g. of the desired 1,4-dimethyl-5-phenyl-5-butylamino-7-chloro-1,3,4,5-tetrahydro-2-H-1,4-benzodiazepine-2-one.
Melting point: 116°–118°C.
Infrared absorption spectrum (paste method): 3,250; 3,050; 2,800; 1,705; 1,600; 1,570; 1,510 cm$^{-1}$

EXAMPLE 9

1.0 g of 1,4-dimethyl-2-oxo-5-phenyl-7-chloro-1,3-dihydro-2H-1,4-benzodiazepinium methylsulfate was added to 5 ml. of ethanol containing 610 mg. of ethanolamine and then stirred for 3 hours. The resulting reaction liquid was diluted with ether, washed with water, and dried, and the solvent was then distilled off to obtain 0.67 g. of the desired 1,4-dimethyl-5-phenyl-5-hydroxyethylamino-7-chloro-1,3,4,5-tetrahydro-2H-1,4-benzodiazepine-2-one as an oily substance. This compound showed the following infrared absorption spectrum (film method).
3,350; 1,690; 1,605; 1,570; 1,510 cm$^{-1}$

EXAMPLE 10

By the reaction of 1,4-dimethyl-2-oxo-5-phenyl-7-chloro-1,3-dihydro-2H-1,4-benzodiazepinium methylsulfate with N',N'-diethylaminoethylamine as in Example 1, the desired 1,4-dimethyl-5-phenyl-5-(N', N'-diethylaminoethylamino)-7-chloro-1,3,4,5-tetrahydro-2H-1,4-benzodiazepine-2-one was obtained as white fine needles. This compound had the following properties.
Melting point: 162°–164°C.
Infrared absorption spectrum (paste method): 3,250; 3,050; 2,800; 1,700; 1,600; 1,570; 1,510 cm$^{-1}$

EXAMPLE 11

By reacting 1,4-dimethyl-2-oxo-5-phenyl-7-chloro-1,3-dihydro-2H-1,4-benzodiazepinium methylsulfate with benzylamine as in Example 8, the desired 1,4-dimethyl-5-phenyl-5-benzylamino-7-chloro-1,3,4,5-tetrahydro-2H-1,4-benzodiazepine-2-one was obtained as white needles. This compound had the following properties.
Melting point: 170°–171.5°C.
Infrared absorption spectrum (paste method):
3,250; 1,700; 1,600; 1,510; 1,400; 910; 820 cm$^{-1}$

EXAMPLE 12

By the reaction of 1,4-dimethyl-2-oxo-5-phenyl-7-chloro-1,3-dihydro-2H-1,4-benzodiazepinium methylsulfate with hydrazine, the desired 1,4dimethyl-5-phenyl-5-hydrazino-7-chloro-1,3,4,5-tetrahydro-2H-1,4-benzodiazepine-2-one was obtained as an oily substance.
Infrared absorption spectrum (film method): 3,375; 3,275; 3,200; 3,050; 2,800; 1,650; 1,600; 1,570; 1,500 cm$^{-1}$

EXAMPLE 13

By the reaction of 2-oxo-4-methyl-5-phenyl-7-chloro-1,3-dihydro-2H-1,4-benzodiazepinium methylsulfate with ethanolic methylamine as in Example 5, the desired 4-methyl-5-phenyl- 5-methylamino-7-chloro-1,3,4,5-tetrahydro-2H-1,4-benzodiazepine-2-one was obtained as white fine needles.
Melting point: 193°–195.5°C.
Infrared absorption spectrum (paste method): 3,420; 3,310; 3,050; 2,800; 1,705; 1,610; 1,580; 1,490; 1,395 cm$^{-1}$

EXAMPLE 14

540 mg of 1,4-dimethyl-2-oxo-5-phenyl-7-chloro-1,3-dihydro-2H-1,4-benzodiazepinium methylsulfate was added to a mixed liquid of 30 percent aqueous ethylamine solution and 5 ml. of ether under cooling with ice. After the mixture was stirred for 3 hours, the reaction liquid was diluted with ether and the ether phase was separated and washed with water. After drying, the ether was distilled off to obtain 350 mg. of the desired 1,4-dimethyl-5-phenyl-5-ethylamino-7-chloro-1,3,4,5-tetrahydro-2H-1,4-benzodiazepine-2-one.
Melting point: 144°–144.5°C.

EXAMPLE 15

In a similar way was in Example 14, 1,4-dimethyl-5-(ortho-fluorophenyl)-5-ethylamino-7-chloro-1,3,4,5-tetrahydro-2H-1,4-benzodiazepine-2-one was obtained from 1,4-dimethyl-2-oxo-5-(ortho-fluorophenyl)-7-chloro-1,3-dihydro-2H-1,4-benzodiazepinium methylsulfate and ethylamine.
Melting point: 173°–175°C.

EXAMPLE 16

540 mg. of 1,4-dimethyl-2-oxo-5-phenyl-7-chloro-1,3-dihydro-2H-1,4-benzodiazepinium methylsulfate was added to 10 ml. of methanol containing 590 mg. of sodium cyanide under cooling. After the mixture was stirred for 3 hours at room temperature, it was diluted with ether and then ether layer was separated, washed with water and dried. By distillation of the solvent, 400 mg. (white crystals, yield: 94 percent) of the desired 1,4-dimethyl-2-oxo-5-phenyl-5-cyano-7-chloro-1,3,4,5-tetrahydro-2H-1,4-benzodiazepine was obtained. Recrystallization from ethanol gave the desired product as colorless needles containing crystalline ethanol.
Melting point: 134° – 135.5°C.
Elemental analysis:

|  | C(%) | H(%) | N(%) | Cl(%) |
|---|---|---|---|---|
| Calculated (for $C_{18}H_{16}N_3ClO·½ C_2H_5OH$) | 65.42 | 5.49 | 12.06 | 10.16 |
| Found | 65.34 | 5.59 | 11.78 | 10.24 |

Infrared absorption spectrum (paste method): 3.050; 1,670; 1,590; 1.480; 1,365; 1,110 cm$^{-1}$
Nuclear magnetic resonance spectrum (CDCl$_3$): 3.45 (δ value, 3H, s, N$^1$—CH$_3$), 2.65 (3H, s, N$^4$—CH$_3$), 3.65 and 3.15 (AB$_q$, J = 15 cps)
wherein s represents singlet signal and q represents quartet signal.

EXAMPLE 17

422 mg. of 1,4-dimethyl-2-oxo-5-phenyl-7nitro-1,3-dihydro-2H-1,4-benzodiazepinium methylsulfate was reacted with 500 mg. of sodium cyanide in methanol as in Example 16. A similar working up gave 310 mg. (light yellow crystals, yield: 92 percent) of the desired 1,4-dimethyl-2-oxo-5-phenyl-5-cyano-7-nitro-1,3,4,5-tetrahydro-2H-1,4-benzodiazepine. Upon recrystallization from isopropyl alcohol, yellow needles were obtained.
Melting point: 164.8° – 165.5°C.
Elemental analysis:

|  | C(%) | H(%) | N(%) |
|---|---|---|---|
| Calculated (for $C_{18}H_{16}N_4O_3$) | 64.28 | 4.80 | 16.66 |
| Found | 64.14 | 4.92 | 16.55 | infrared absorption spectrum (paste method): 3,050; 1,670; 1,602; 1,585; 1,525; 1,340; 1,095 cm$^{-1}$
Nuclear magnetic resonance spectrum (CDCl$_3$): 3.55 (3H, s, N$^1$—CH$_3$), 2.65 (3H, s, N$^4$—CH$_3$), 3.65 and 3.25 (2H, AB$_q$, J = 15, 3-position—CH$_2$—)

EXAMPLE 18

429 mg. of 1,4-dimethyl-2-oxo-5-(ortho-fluorophenyl)-7-chloro-1,3-dihydro-2H-1,4-benzodiazepinium methylsulfate was reacted with 500 mg. of sodium cyanide in methanol as in Example 16. By a similar working up, 270 mg. (white crystals, yield: 79 percent) of the desired 1,4-dimethyl-2-oxo-5-(ortho-fluorophenyl)-5-cyano-7-chloro-1,3,4,5-tetrahydro-2H-1,4-benzodiazepine was obtained. Recrystallization from ethanol gave white columnar crystals.
Melting point: 165° – 165.8°C.
Elemental analysis:

|  | C(%) | H(%) | N(%) | Cl(%) |
|---|---|---|---|---|
| Calculated (for $C_{18}H_{15}N_3ClOF$) | 62.89 | 4.49 | 12.22 | 10.31 |
| Found | 62.98 | 4.46 | 12.22 | 10.25 |

Infrared absorption spectrum (paste method); 3,080; 1,675; 1,590; 1,490; 1,270; 1,110; 830 cm$^{-1}$
Nuclear magnetic resonance spectrum (CDCl$_3$): 3.50 (3H, s, N$^1$—CH$_3$), 2.70 (3H, s, N$^4$—CH$_3$), 3.60 and 3.15 (2H, AB$_q$, 3-position—CH$_2$—).

EXAMPLE 19

230 mg. of 4-methyl-2-oxo-5-phenyl-7-chloro-1,3-dihydro-2H-1,4-benzodiazepinium methylsulfate was suspended in 2 ml. of methanol and then 1.5 ml. of methanol containing 120 mg. of acetone cyanohydrin was added thereto. To this reaction mixture triethylamine waa added dropwise until the mixture became basic. Upon stirring the reaction mixture at room temperature, crystals separated out. After stirring for one hour, the crystals were collected by filtration, washed with water and dried. 153 mg. (white crystals, yield: 85 percent) of the desired 4-methyl-2-oxo-5-phenyl-5-cyano-7-chloro-1,3,4,5-tetrahydro-2H-1,4-benzodiazepine was obtained. Recrystallization from isopropyl alcohol gave white prisms.
Melting point: 196.5° – 198.5°C. (decomposed)
Elemental analysis:

|  | C(%) | H(%) | N(%) | Cl(%) |
|---|---|---|---|---|
| Calculated (for $C_{17}H_{14}N_3OCl$) | 65.49 | 4.53 | 13.48 | 11.37 |
| Found | 65.31 | 4.52 | 13.30 | 11.16 |

Infrared absorption spectrum (paste method): 3,100–3,050; 1,710; 1,610; 1,600; 1,485; 1,400 cm$^{-1}$
Nuclear magnetic resonance spctrum (CDCl$_3$): 2.60 (3H, s, N$^4$—CH$_3$), 3.6 (2H, s, 3-position—CH$_2$—).

EXAMPLE 20

A Grignard reagent was prepared from 120 mg. of magnesium and a 20 percent methyl bromide solution in tetrahydrofuran. Under ice-cooling, a suspension of 980 mg. of 1,4-dimethyl-2-oxo-5-phenyl-7-chloro-1,3-dihydro-2H-1,4-benzodiazepinium methylfulfate in tetrahydrofuran was added thereto. After stirring for 1 hour, the reaction mixture was diluted with ether, the resulting precipitated crystals were filtered off, and the mother liquid was extracted with ether. The ethereal solution was washed with water and dried. Then, by distillation of the solvent, 450 mg. of yellow crystals were obtained. Recrystallization of the crystals from methanol gave colorless prisms of 1,4-dimethyl-2-oxo-5-phenyl-5-methyl-7-chloro-1,3,4,5-tetrahydro-2H-1,4-benzodiazepine.
Melting point: 149.0° – 149.5°C.
Elemental analysis:

|  | C(%) | H(%) | N(%) | Cl(%) |
|---|---|---|---|---|
| Calculated (for $C_{18}H_{19}N_2ClO$) | 68.68 | 6.68 | 8.90 | 11.26 |
| Found | 68.75 | 6.05 | 8.83 | 11.03 |

Infrared absorption spectrum (paste method): 3.050; 2,750; 1,670; 1,490; 1,410; 1,350; 1,310; 1,200 cm$^{-1}$
Nuclear magnetic resonance spectrum (CDCl$_3$):
The methyl proton signals at the N$^1$ and N$^4$ positions appeared at 2.45 and 2.30 as singlets (s). The 5-position proton signal appeared at 1.65 (s). The 3-position methylene appeared at 3.4 and 2.6 as AB$_q$ (J = 11 cps).

EXAMPLE 21

From 120 mg. of magnesium and 550 mg. of ethyl iodide, a Grignard reagent was prepared in 5 ml. of ether.

This was added to a suspension of 1.24 g. of 1,4-dimethyl-2-oxo-5-phenyl-7-chloro-1,3-dihydro-2H-1,4-benzodiazepinium methylsulfate in ether under ice-cooling. After 3 hours of stirring, the reaction mixture was diluted with water and extracted with ether. The ethereal layer was washed with water and dried. By distillation of the solvent, 610 mg. of a syrupy substance was obtained. By triturating the substance with methanol, white crystals of the desired 1,4-dimethyl-2-oxo-5-phenyl-5-ethyl-7-chloro-1,3,4,5-tetrahydro-2H-1,4-benzodiazepine were obtained.
Melting point: 139° – 141°C.
Elemental analysis:

|  | C(%) | H(%) | H(%) | Cl(%) |
|---|---|---|---|---|
| Calculated (for $C_{19}H_{21}N_2ClO$) | 69.40 | 6.44 | 8.52 | 10.78 |
| Found | 69.39 | 6.46 | 8.19 | 10.40 |

Infrared absorption spectrum (paste method): 2,775; 1,670; 1,480; 1,410; 1,315; 1,140; 1,100; 1,025 cm$^{-1}$
Nuclear magnetic resonance spectrum (CDCl$_3$):
The methyl proton signals at the N$^1$ and N$^4$ positions appeared at 2.37 (s) and 2.18 (s).

EXAMPLE 22

From 96 mg. of magnesium and n-butyl bromide, a Grignard reagent was prepared in ether. To this, 1.0 g. of 1,4-dimethyl-2-oxo-5-phenyl-7-chloro-1,3-dihydro-2H-1,4-benzodiazepinium methylsulfate was added. The mixture was reacted and worked up as in Example 20 to obtain 560 mg. of 1,4-dimethyl-2-oxo-5-phenyl-5-butyl-7-chloro-1,3,4,5-tetrahydro-2H-1,4-benzodiazepine as white crystals.
Melting point: 137° – 140°C.
Elemental analysis:

|  | C(%) | H(%) | N(%) |
|---|---|---|---|
| Calculated (for $C_{21}H_{25}N_2ClO$) | 70.68 | 7.06 | 7.85 |
| Found | 70.66 | 7.06 | 7.82 |

Infrared absorption spectrum (paste method): 2,775; 1,665; 1,405; 1,300; 1,180; 1,130; 1,100; 1,025 cm$^{-1}$
Nuclear magnetic resonance spectrum (CDCl$_3$):
The methyl proton signals at the N$^1$ and N$^4$ positions appeared at 2.38 (s) and 2.20 (s).

EXAMPLE 23

From 120 mg. of magnesium and a 20 percent methyl bromide solution in tetrahydrofuran, a Grignard reagent was prepared. To this, 980 mg. of 4methyl-2-oxo-5-phenyl-7-chloro-1,3-dihydro-2H-1,4-benzodiazepinium methylsulfate was added under ice-cooling and the mixture was stirred for about 1 hour. The reaction mixture was diluted with ether, and the precipitated crystals were filtered off. The mother liquid was diluted with ether. The ethereal layer was washed with water and dried, and then the solvent was distilled off to obtain 610 mg. of crystals. The crystals were recrystallized from methanol to give white crystals of the desired 4-methyl-2-oxo-5-phenyl-5-methyl-7-chloro-1,3,4,5-tetrahydro-2H-1,4-benzodiazepine.
Melting point: 178° – 181°C.
Elemental analysis:

| | C(%) | H(%) | N(%) | Cl(%) |
|---|---|---|---|---|
| Calculated (for $C_{17}H_{17}N_2ClO$) | 67.90 | 5.70 | 9.32 | 11.79 |
| Found | 67.74 | 5.61 | 9.16 | 12.01 |

Infrared absorption spectrum (paste method): 3,100; 3,080; 1,665; 1,580; 1,490; 1,415; 1,405; 1,320; 1,270; 1,210; 1,035; 880 cm$^{-1}$
Nuclear magnetic resonance spectrum (CDCl$_3$):
The NH proton signal at the N$^1$ position appeared at 12.55. the methyl proton signal at the 5-position appeared at 1.90 (s). The methylene proton signal at the 3-position appeared at 3.70 and 3.30 as AB$_q$ (J = 17 cps).

EXAMPLE 24

120 mg. of magnesium was added to 30 ml. of methanol. A catalitic amount of carbon tetrachloride was then added to initiate magnesium methoxidation reaction. Thereafter, 1.0 g. of 1,4-dimethyl-2-oxo-5-phenyl-7-chloro-1,3-dihydro-2H-1,4-benzodiazepinium methylfulfate was added thereto under cooling with ice. After reaction for 1 hour at room temperature, the mixture was cooled with ice, and the white crystals that separated out were collected by filtration. Upon recrystallization from methanol, 0.3 g. of white prisms of 1,4-dimethyl-2-oxo-5-phenyl-5-methoxy-7-chloro-1,3,4,5-tetrahydro-2H-1,4-benzodiazepine were obtained.
Melting point: 107° – 108°C.
Infrared absorption sepctrum (paste method): 3,100; 3,050; 2,800; 1,675; 1,590; 1,430; 1,410; 1,315; 1,215; 1,175; 1,120; 1,090; 1,080; 1,060; 1,020 cm$^{-1}$
Nuclear magnetic resonance spectrum (CDCl$_3$): 2.37 (3H, s, N$^4$—CH$_3$), 2.80 (3H, s, N$^1$—CH$_3$), 3.10 (3H, s, —O—CH$_3$), 3.52 and 3.23 (AB type q, J = 13 cps).

EXAMPLE 25

120 mg. of magnesium, 40 ml. of ethanol, and 1.0 g. of 1,4-dimethyl-2-oxo-5-phenyl-7-chloro-1,3-dihydro-2H-1,4-benzodiazepinium methylsulfate were reacted as in Example 24. The reaction mixture was diluted with ether, washed with water and dried. Distillation of the solvent gave crude crystals, which were recrystallized from methanol to give white prisms of 1,4-dimethyl-2-oxo-5-phenyl-5-ethoxy-7-chloro-1,3,4,5-tetrahydro-2H-1,4-benzodiazepine.
Melting point: 100° – 101.5°C.
Infrared absorption spectrum (paste method): 3,100; 3,050; 2,800; 1,670; 1,590; 1,420; 1,400; 1,330; 1,300; 1,285; 1,250; 1,200; 1,180; 1,120; 1,060; 1,055 cm$^{-1}$
Nuclear magnetic resonance spectrum (CDCl$_3$): 2.35 (3H, s, N$^4$—CH$_3$), 2.7 (3H, s, N$^1$—CH$_3$), 1.2 (3H, t, —OCH$_2$CH$_3$), 3.55 and 3.12 (AB type q, 2H, J = 13 cps) wherein t represents a triplet signal.

EXAMPLE 26

120 mg. magnesium, 10 ml. of methanol, and 1.0 g. of 1,4-dimethyl-2-oxo-5-phenyl-(ortho-fluorophenyl)-7-chloro-1,3-dihydro-2H-1,4-benzodiazepinium methylsulfate were reacted as in Example 24. Upon recrystallization from ethanol of the crude crystals, the desired 1,4-dimethyl-2-oxo-5-(ortho-fluorophenyl)-5-methoxy-7-chloro-1,3,4,5-tetrahydro-2H-1,4-benzodiazepine was obtained as colorless prisms.
Melting point: 91° – 92.5°C.
Infrared absorption spectrum (paste method): 3,100; 3,050; 2,800; 1,675; 1,610; 1,590; 1,580; 1,430; 1,410;

1,315; 1,275; 1,215; 1,200; 1,185; 1,100; 1,070; 1,025 cm⁻¹
Nuclear magnetic resonance spectrum (CDCl₃): 2.35 (3H, s, N⁴—CH₃), 2.8 (3H, s, N¹—CH₃), 3.1 (3H, s, —OCH₃).

EXAMPLE 27

120 mg. magnesium, 7 ml. of methanol, and 1.0 g. of 4-methyl-2-oxo-5-phenyl-7-chloro-1,3-dihydro-2H-1,4-benzodiazepinium methylsulfate were reacted as in Example 24. The reaction mixture was diluted with ether, washed with water and dried. Recrystallization of the crude crystals from methanol gave colorless prisms of 4-methyl-2-oxo-5-phenyl-5-methoxy-7-chloro-1,3-dihydro-2H-1,4-benzodiazepine.
Melting point: 201° - 203°C.
Infrared absorption spectrum (paste method): 3,175; 3,040; 1,655; 1,580; 1,490; 1,415; 1,355; 1,230; 1,135; 1,125; 1,050 cm⁻¹
Nuclear magnetic resonance spectrum (CD₃COCD₃): 2.45 (3H, s, N⁴—CH₃), 2.75 (3H, s, —OCH₃), 3.6 and 3.1 (AB type q, 2H, J = 15 cps).

EXAMPLE 28

A Grignard reagent was prepared from 120 mg. of magnesium and ethyl bromide in ether. 700 mg. of propargyl alcohol tetrahydropyranyl ether dissolved in 10 ml. of tetrahydrofuran was added thereto dropwise over about 30 minutes at room temperature, and the temperature was raised to 60°C. The reaction mixture was then cooled. Under ice-cooling, 1.20 g. of 4-methyl-2-oxo-5-phenyl-7-chloro-1,3-dihydro-2H-1,4-benzodiazepinium methylsulfate was added to this reaction mixture. After stirring for about 3 hours, the reaction mixture was diluted with water and extracted with ether. The ethereal layer was washed with water and then dried. Distillation of the solvent gave 1.04 g. of a syrupy substance. By triturating with methanol, white prisms of the desired 4-methyl-2-oxo-5-phenyl-5(3'-tetrahydropyranyloxy-1'-propynyl)-7-chloro-1,3,4,5-tetrahydro-2H-1,4-benzodiazepine were obtained.
Melting point: 161.5° - 162.5°C.
Infrared absorption spectrum (paste method): 3,200; 3,100; 2,800; 1,675; 1,595; 1,410; 1,210; 1,105; 1,065; 1,025; 1,000; 960 cm⁻¹
Nuclear magnetic resonance spectrum (CDCl₃): 14.30 (1H, bs), 7.65-6.80 (8H, m), 4.87 (1H, bs), 4.45 (2H, s), 3.6, 3.5 (2H, d, J = 3 cps), 2.45 (3H, s), 1.63 (8H, bs), wherein m represents a multiplet signal, d represents a doublet signal, bs represents a broad singlet signal.

EXAMPLE 29

A Grignard reagent was prepared from 120 mg. of magnesium and ethyl bromide in ether. 840 mg. of N-propargyl-3-aza-bicyclo [3,2,2] nonane dissolved in 10 ml. of tetrahydrofuran was added thereto. By addition of 1.2 g. of 4-methyl-2-oxo-5-phenyl-7-chloro-1,3-dihydro-2H-1,4-benzodiazepinium methylsulfate to the Grignard reagent to react therewith and by working as in Example 1, 350 mg. of white prisms of the desired 4-methyl-2-oxo-5-phenyl-5-{3'-[3'''-aza-bicyclo (3,2,2)-3''-nonyl]-1'-propynyl}-7-chloro-1,3,4,5-tetrahydro-2H-1,4-benzodiazepine was obtained.
Melting point: 202° - 203°C.

Infrared absorption spectrum (paste method): 3,200; 3,075; 2,800; 1,680; 1,410; 1,215; 1,110; 1,065; 985; 945 cm⁻¹
Nuclear magnetic resonance spectrum (CDCl₃): 14.45 (1H, bs), 7.8-6.8 (8H, m), 3.60 (4H, bs), 2.78, 2.73 (4H, two s), 2.50, 2.47 (3H, two s), 1.8 (2H, bs), 1.67 (8H, s).

What we claim is:
1. A compound of the formula:

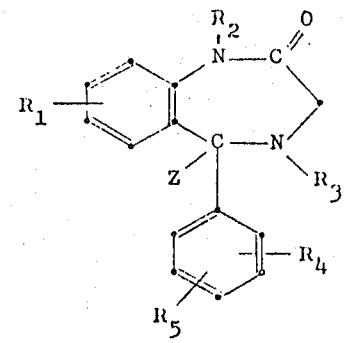

wherein $R_1$ is a halogen atom or nitro, $R_2$ is hydrogen or $C_1$ — $C_6$ alkyl; $R_3$ is $C_1$ — $C_4$ alkyl; $R_4$ and $R_5$ are hydrogen or ortho-halogen and Z is amono, $C_1$ — $C_4$ alkyl amino, hydroxy-$C_1$ — $C_4$ alkyl amino, an N',N'-dilower alkylamino -$C_1$ — $C_4$ alkyl, benzylamino, hydrazino, cyano, $C_1$ — $C_6$ alkyl, $C_2$ — $C_7$ alkoxy, 3'-tetrahydropyranyloxy-1'-propynyl or 3'-(3''-aza-bicyclo(3,2,2,)-2''-nonyl)-1'-propynyl.

2. A compound of the claim 1, wherein Z is a cyano.

3. A compound of the claim 1, wherein Z is a $C_1$ — $C_6$ alkyl, 3-tetrahydropyranyloxy-1-propynyl or 3-[3'-aza-bicyclo(3,2,2)-3'-nonyl]-1'-propynyl.

4. A compound of the claim 1, wherein Z is an amino, $C_1$ — $C_4$ alkylamino, hydroxy-$C_1$ — $C_4$ alkyl amino, N',N'—N',N'-di-lower alkyl amino-$C_1$ — $C_4$ alkyl, benzylamino or hydrazino.

5. A method for producing 1,4-benzodiazepine derivatives of the formula:

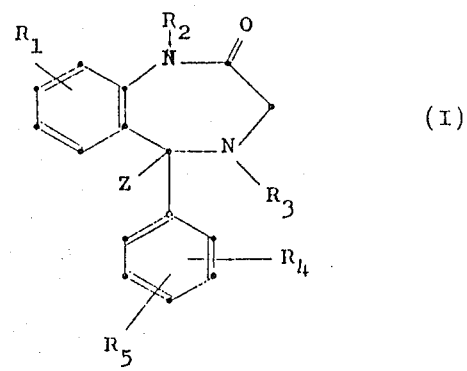

(I)

wherein $R_1$ is a halogen atom or nitro, $R_2$ is hydrogen or $C_1$ — $C_6$ alkyl, $R_3$ is $C_1$ — $C_4$ alkyl, $R_4$ and $R_5$ are hydrogen or ortho-halogen and Z is amino, $C_1$ — $C_4$ alkyl amino, hydroxy - $C_1$ — $C_4$ alkyl amino, an N',N'-dilower alkyl amino-$C_1$ — $C_4$ alkyl, benzylamino, hydrazino, cyano, $C_1$ — $C_6$ alkyl, $C_2$—$C_7$ alkoxy, 3'-tetrahydropyranyloxy-1'-propynyl or 3'-(3''- azabicyclo(3,2,2,)-2''-nonyl)-1'-propynyl, consisting essentially of reacting a 1,4-benzodiazepinium derivative represented by the following formula:

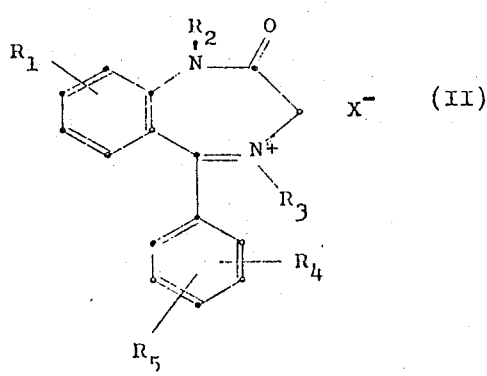

(II)

wherein $R_1$, $R_2$, $R_3$, $R_4$ and $R_5$ are as defined above and $X^-$ represents an acid anion, with at least one mole of the following reactants:

a. an amino derivative of the formula:

(III)

wherein $R_6$ and $R_7$ are selected from hydrogen, $C_1$—$C_6$ alkyl, hydroxy-$C_1$ — $C_4$ alkyl, N',N'-diloweralkyl amino-$C_1$ — $C_4$ alkyl, benzyl or amino b. a cyanation agent, c. an alkyl metal compound of the formula $$R_8 - Y$$

(IV)

wherein $R_8$ is $C_1$ — $C_6$ alkyl and Y represents magnesium halide, an alkali metal or an alkaline earth metal, d. an alcoholic compound of the formula:

$$R_{91} - OH$$

(V)

wherein $R_{91}$ is a $C_1$ - $C_6$ alkyl and, e. a metal compound of an acetylenic derivative of the formula:

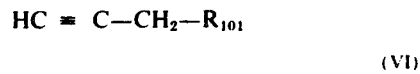

(VI)

wherein $R_{101}$ is tetrahydropyranyloxy of 3-aza-bicyclo(3,2,2,)-2-nonyl.

6. A method according to claim 5, wherein the cyanation agent is selected from the group consisting of sodium cyanide and potassium cyanide.

7. A method according to claim 5, wherein Y is selected from the group consisting of magnesium chloride, magnesium bromide and magnesium iodide.

8. A method according to claim 5, wherein a 1,4-benzodiazepinium derivative of the formula (II) is reacted with a magnesium salt of the alcohol of the formula (V).

9. A method according to claim 5, wherein a 1,4-benzodiazepinium derivative of the formula (II) is reacted with a compound selected from the group consisting of magnesium halide, lithium, sodium and potassium salts of the acetylenic compounds of the formula (VI).

* * * * *